United States Patent [19]

Szum

[11] Patent Number: 5,502,145
[45] Date of Patent: Mar. 26, 1996

[54] COATING SYSTEM FOR GLASS STRENGTH RETENTION

[75] Inventor: David M. Szum, Elmhurst, Ill.

[73] Assignee: DSM Desotech. Inc., Elgin, Ill.

[21] Appl. No.: 204,993

[22] Filed: Mar. 2, 1994

[51] Int. Cl.⁶ .......................... C08G 77/04; C08L 75/16; C08L 83/06
[52] U.S. Cl. .................. 528/28; 528/33; 522/91; 522/97
[58] Field of Search .............. 522/172, 91, 96, 522/98; 528/33, 39, 28, 38, 32

[56] References Cited

U.S. PATENT DOCUMENTS

| | | | |
|---|---|---|---|
| 3,404,130 | 10/1968 | Sigura et al. | 528/28 |
| 3,585,065 | 6/1971 | Johnson | 522/91 |
| 4,311,737 | 1/1982 | Ishizaka et al. | 528/33 |
| 4,543,404 | 9/1985 | Sugano et al. | 522/91 |
| 4,682,851 | 2/1987 | Ansel | 350/96.34 |
| 4,849,462 | 7/1989 | Bishop | 522/97 |
| 4,932,750 | 6/1990 | Ansel et al. | 350/96.34 |
| 5,000,541 | 3/1991 | DiMarcello et al. | 350/96.3 |
| 5,112,658 | 5/1992 | Skutnik et al. | 428/34.6 |
| 5,188,864 | 2/1993 | Lee et al. | 522/99 |
| 5,214,734 | 5/1993 | Inniss et al. | 385/128 |
| 5,219,896 | 6/1993 | Coady et al. | 522/96 |
| 5,229,433 | 7/1993 | Schunck et al. | 522/96 |

Primary Examiner—Marion E. McCamish
Attorney, Agent, or Firm—Dressler, Goldsmith, Shore & Milnamow, Ltd.

[57] ABSTRACT

This invention provides an improved coating composition for glass substrates that comprises a poly(siloxane). The introduction of a poly(siloxane) in a coating composition for a glass substrate, and in particular an optical fiber, acts to delay the rate of deterioration of the glass or optical fiber due to moisture, and improves adhesion between the glass substrate and the coating composition. The introduction of a poly(siloxane) into a polymeric coating composition also improves the interlayer adhesion when more than one coating is applied to a glass substrate. This invention also provides an improved coated glass substrate having a decreased rate of deterioration due to moisture, improved adhesion between the glass substrate and the coating composition and between the various coatings, wherein the coating composition comprises a poly(siloxane).

6 Claims, 1 Drawing Sheet

COATING SYSTEM FOR GLASS STRENGTH RETENTION

TECHNICAL FIELD

This invention relates to an improved polymeric coating composition for glass substrates that comprises a poly(siloxane).

BACKGROUND OF THE INVENTION

It has long been known that glass substrates are weakened upon exposure to water. For example, moisture in air can cause weakening and the eventual breakage of glass.

Typically, glass substrates have been coated with polymeric compositions for various reasons, such as to protect and preserve the strength of a glass object, to prevent damage during handling, and to prevent moisture from attacking the glass substrate. In addition, polymeric coatings have been applied to optical fibers to decrease the microbending of the optical fiber, which can reduce the transmission of electromagnetic radiation through the fiber. However, it has been found that many coating compositions are water permeable and therefore not very effective in protecting the glass substrate from moisture.

In addition to causing the weakening of glass substrates, moisture can also cause polymeric compositions that have been applied to the glass substrate to break away, i.e., delaminate, from the glass surface. The delamination of a polymeric composition can result in a weakened glass substrate, as the polymeric coating no longer protects the glass from environmental stresses.

Various coating compositions have been used to prevent the deterioration of glass substrates, and specifically optical fibers, to improve the useful life of the glass substrate to which it is applied. For example, U.S. Pat. No. 5,000,541, issued to DiMarcello et al. teaches a method for hermetically sealing an optical fiber with carbon, which prevents water from contacting the optical fiber, and thus prolongs the useful life of the optical fiber. Similarly, U.S. Pat. No. 4,849,462, issued to Bishop et al. teaches the incorporation of various organofunctional silanes into a coating composition to improve the adhesion between a coating composition for an optical fiber and the optical fiber, particularly in moist environments.

Likewise, U.S. Pat. No. 5,214,734, issued to Inniss et al. teaches the incorporation of particulate silica in a polymeric coating composition to increase the fatigue resistance of an optical fiber or glass to moisture.

Many coating compositions have drawbacks that make them unsuitable for certain applications. For example, some of the compositions may be too expensive to use in the production of low cost optical fibers or glass objects, and the introduction of particulate matter into a coating composition as disclosed in the Inniss et al. patent can present problems such as scratching the pristine optical glass fiber, resulting in breakage at low tensile loads, a turbid coating composition which has a tendency to gel, and other processing problems that are commonly encountered when working with particulate matter.

Coatings which are modified with organofunctional silanes, such as the above referenced Bishop et al. patent, do improve the wet adhesion of a coating applied to an optical fiber substrate, but do not significantly improve the glass strength retention capability of the coating.

SUMMARY OF THE INVENTION

This invention provides an improved coating composition for glass substrates, preferably silica-based optical fibers, wherein the composition contains a poly(siloxane). Preferably, the poly(siloxane) is present in a curable coating composition in an amount in the range of about 0.1% and about 30% by weight of the entire composition, and the poly(siloxane) has the formula:

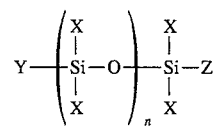

wherein Y and Z are independently selected from the group consisting of halogen, amino, alkyl and alkoxy; n is one or more; and each X is independently a group that is hydrolyzable in the presence of water. Preferably, n is two or more, X is alkoxy and the coating composition is UV curable.

This invention also provides improved glass substrates that are coated with a composition that comprises a poly(siloxane). The resulting coated glass substrate has a decreased rate of deterioration due to moisture attack, improved adhesion between the glass substrate and the coating adjacent to the glass, and improved adhesion between coating layers if more than one coating layer containing a poly(siloxane) is applied to the glass substrate.

DETAILED DESCRIPTION OF THE PREFERRED EMBODIMENT

Figure 1:
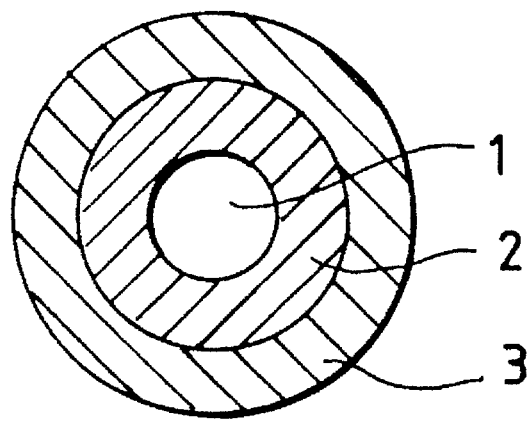
FIG. 1 is a cross sectional view of an optical fiber having two coatings.

The present invention contemplates a glass substrate, and specifically a silica-based optical fiber, that is coated with at least one polymeric coating composition. Most glass substrates, such as glass bottles, are usually coated with only one polymeric coating. An optical fiber substrate, however, usually has more than one coating. When a substrate has more than one coating, the various coating compositions may be the same or different. As used herein, the word "substrate" shall mean a glass object or a silica-based optical fiber. Some examples of glass objects include, but are not limited to, bottles, light bulbs, windows, etc. In one preferred embodiment, the glass substrate is a silica-based optical fiber.

The present invention is directed to an improved polymeric coating composition that comprises a poly(siloxane). The addition of a poly(siloxane) to the polymeric composition delays glass strength deterioration, provides excellent wet adhesion of the coating to a substrate and improves adhesion between adjacent coating layers that both contain a poly(siloxane). Glass strength deterioration can typically be measured by industry standard static and/or dynamic fatigue tests. The poly(siloxane) may be added to various coating compositions that are known in the art. For example, U.S. Pat. No. 5,112,658, to Skutnik et al., issued May 12, 1992, discloses coating compositions for glass containers. The Skutnik et al. patent is hereby incorporated by reference. Preferably, the substrates used in the present invention are mostly silicon-based.

The addition of a poly(siloxane) to a polymeric coating composition provides for better strength retention of the substrate coated therewith. The poly(siloxane) has the formula:

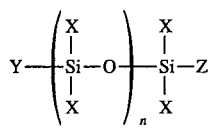

wherein Y and Z are independently selected from the group consisting of halogen, amino, alkyl and alkoxy; n is one or more; and each X is independently a group that is hydrolyzable in the presence of water.

Some representative examples of groups that are hydrolyzable in the presence of water include alkoxy groups and the halogens. Preferably, each X is an alkoxy group, more preferably, a lower alkoxy group.

As used herein the term "alkyl" shall mean a monovalent straight chain or branched chain group of 1 to 12 carbon atoms including, but not limited to, methyl, ethyl, n-propyl, isopropyl, n-butyl, sec-butyl, isobutyl, tertbutyl and the like.

As used herein the term "alkoxy" shall mean an alkyl group attached to the remainder of the molecule through an oxygen atom including, but not limited to, methoxy, ethoxy, isopropoxy, n-butoxy, sec-butoxy, isobutoxy, tert-butoxy and the like. Preferably, the alkyl portions of the alkoxy groups are lower alkyl groups.

As used herein, the term "lower alkyl group" shall mean an alkyl group, branched or unbranched, cyclic or acyclic, having from 1 to 10 carbon atoms inclusive. Some examples of lower alkyl groups include, but are not limited to, methyl, ethyl, propyl, isopropyl, butyl, pentyl and cyclohexyl. Most preferably, each alkyl group is methyl or ethyl.

As used herein the term "lower alkoxy group" shall mean an alkyl group attached to the remainder of the molecule through an oxygen atom, where the alkyl group is a lower alkyl group.

It is contemplated that the siloxane main chain may be linear or branched. A branched structure results when some Xs are alkoxy groups and some Xs are siloxane groups. It is also contemplated that each alkoxy group may be the same or different. In general, OR may be any group that may be hydrolyzed from the siloxane in the presence of water. A particularly preferred methoxy functional poly(siloxane) is Dow Corning 1-6184, which has the following general structure:

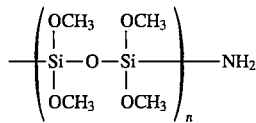

wherein n is 2 or more.

Preferably, the poly(siloxane) is a liquid so that it may be easily added to a polymeric coating composition. Alternatively, the poly(siloxane) may be a solid that is soluble in the polymeric coating composition.

The improved coating compositions of the present invention may contain one poly(siloxane) or it may contain a mixture of poly(siloxanes). Typically, the poly(siloxane) is present in the coating composition in an amount sufficient to delay deterioration of the substrate upon which the composition containing the poly(siloxane) is coated. Preferably, the poly(siloxane) is present in the coating composition in the range of about 0.1% to about 30% by weight of the entire composition. However, an effective amount of poly(siloxane) for a particular coating composition may vary and can be determined by trial and error.

Glass substrates are typically coated with only one coating composition. An optical fiber substrate, however, may be coated with more than one coating composition. In the case of the optical fiber substrate, the various coatings may have the same composition or the coatings may have different compositions. For example, some of the coatings may contain a poly(siloxane) and some of the coatings may not.

FIG. 1 illustrates a coating configuration that is available in the optical fiber industry. The central substrate labeled 1 is a glass substrate, in this case a silica-based optical fiber. The coating layer 2, which is directly adjacent to the glass, is typically termed the inner primary coating or innermost layer. The coating layer 3 that surrounds the inner primary coating is typically termed the outer primary coating. As used herein, the term "inner primary coating" is any coating directly adjacent to a silica-based optical fiber, while the term "outer primary coating" will apply to any coating or coatings which overcoats the inner primary coating.

Figure 2:
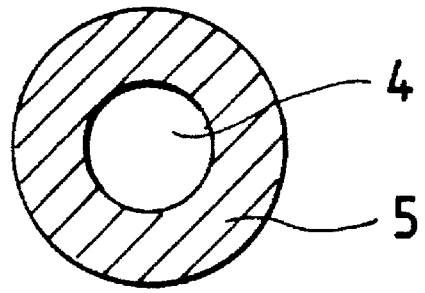
FIG. 2 is a cross sectional view of an optical fiber having one coating.

FIG. 2 illustrates another coating configuration for glass substrates, which is also available in the optical fiber industry. The central substrate labeled 4 is the glass substrate, in this case a silica-based optical fiber. The sole coating layer labeled 5 is generally termed a single coat and is characterized by the fact that it is the only coating layer present on the glass substrate. As used herein, the term "single coat" is any coating adjacent to a glass optical fiber substrate that is not immediately overcoated.

It is understood that any or all of the coating layers described may independently contain a poly(siloxane) to obtain the strength retention benefit. In one embodiment of the present invention, the outer primary coating contains a poly(siloxane) to obtain the strength retention benefit.

The addition of the poly(siloxane) to the inner primary coating, in addition to obtaining the strength retention benefit, has the additional desired benefit of improving the adhesion of the coating to the glass under high humidity conditions. In a preferred embodiment, the coating that is adjacent to the substrate, i.e., the inner primary coating, contains a poly(siloxane) to obtain the improved wet adhesion benefit.

A coating composition of the present invention may be prepared by combining curable oligomers and monomers along with other components and the selected poly(siloxane). For example, the oligomers useful in the compositions of the present invention may be the reaction product of a hydroxy functional monomer containing ethylenic unsaturation and an isocyanate that is then further reacted with a hydroxy functional polyether that contains branched, oxyalkylene repeating units. The branched oxyalkylene repeating units have about 2 to about 6 carbon atoms. The resulting oligomers have molecular weights that are generally in the range of about 700 to about 3000, preferably about 1000 to about 2000. They are also substantially free of isocyanate functionality.

These end-capped oligomers can be combined with reactive diluents, photoinitiators, antioxidants and light stabilizers to form the curable compositions of the present invention.

Any of a wide variety of organic polyisocyanates, alone or in admixture, can be reacted with the hydroxy functional monomer containing ethylenic unsaturation. The reaction product of the isocyanate and the hydroxy functional monomer is then further reacted with the polyether containing branched chain, oxyalkylene repeating units to form polyether oligomers.

Representative diisocyanates include isophorone diisocyanate (IPDI), toluene diisocyanate (TDI), diphenylmethylene diisocyanate, hexamethylene diisocyanate, cyclohexylene diisocyanate, methylene dicyclohexane diisocyanate, 2,2,4-trimethyl hexamethylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, and polyalkyloxide and polyester glycol diisocyanates such as polytetramethylene ether glycol terminated with TDI and polyethylene adipate terminated with TDI, respectively. Preferred isocyanates are TDI and IPDI.

The isocyanate is reacted with the hydroxy functional ethylenically unsaturated monomer. These hydroxy functional ethylenically unsaturated monomers are preferably acrylates, vinyl ethers, maleates, fumarates or other unsaturated functional groups.

In the reaction between hydroxy and isocyanate groups, it is preferred to employ a stoichiometric balance between hydroxy and isocyanate functionality and to maintain the reactants at a reaction temperature of at least about 25° C. The hydroxy functionality should be substantially consumed. The mole ration of the isocyanate to the hydroxy functional ethylenically unsaturated monomer is in the range of about 3:1 to about 1.2:1, preferably about 2:1 to about 1.5:1. The hydroxy functional ethylenically unsaturated monomer attaches to the isocyanate via an urethane linkage.

The reaction product of the isocyanate and the ethylenically unsaturated monomer is further reacted with the polyether containing branched, oxyalkylene repeating units. The resulting polyether oligomer is end-capped with the reaction product from the isocyanate/ethylenically unsaturated monomer reaction. By "end-capped" it is meant that a functional group caps each of the two ends of the polyether.

Suitable monomers that are useful to endcap the polyether with the desired (meth)acrylate functional groups include hydroxy functional acrylates such as 2-hydroxyethyl acrylate, 2-hydroxypropyl acrylate and the like. Suitable monomers which will endcap the polyether with the desired vinyl ether functional groups include 4-hydroxybutyl vinyl ether, and triethylene glycol monovinyl ether. Suitable monomers which will endcap the polyether with the desired maleate functional group, include maleic acid and hydroxy functional maleates. As used herein, the term "(meth)acrylate" and the various grammatical forms thereof, shall mean esters that are the reaction product of acrylic or methacrylic acid with a compound that contains a hydroxyl functional group.

As stated above, the product of the reaction of the isocyanate and ethylenically unsaturated hydroxy functional monomer is reacted with a polyether that contains branched, oxyalkylene repeating units. These branched, oxyalkylene repeating units preferably contain about 2 to about 6 carbon atoms. Polyether copolymers that contain both branched and nonbranched oxyalkylene repeating units are also suitable. Preferably, the polyether contains at least 20 percent by weight of the above-described branched, oxyalkylene repeating units.

The preferred polyethers are poly(oxyisopropylene), marketed by Union Carbide, Danbury, Conn., and poly(oxymethyltetramethylene). Poly(oxymethyltetramethylene) is preferably the polymerization product of 3-methyltetrahydrofuran, which has undergone a ring opening polymerization.

If the polyether contains repeating units in addition to the branched, oxyalkylene repeating units described above, those repeating units are preferably oxyalkylene repeating units with about 2 to about 5 carbon atoms. A polyether which is the polymerization product of 20 percent by weight of 3-methyltetrahydrofuran and 80 percent by weight of tetrahydrofuran, both of which have undergone a ring opening polymerization, is an example of a suitable polyether containing both branched and nonbranched oxyalkylene repeating units. This polyether copolymer is marketed as PTGL 1000 by the Hodogaya Chemical Company of Japan.

The isocyanate/hydroxy functional monomer reaction product attaches to the polyether containing branched, oxyalkylene repeating units via an urethane linkage. The urethane reaction by which this linkage is formed takes place in the presence of a catalyst. Catalysts for the urethane reaction, such as diazabicyclooctane crystals and the like, are suitable for this purpose. The mole ratio of the isocyanate/hydroxy functional monomer reaction product to the polyether with branched, oxyalkylene repeating units is in the range of about 3:1 to about 1.2:1, preferably about 2:1 to about 1.5:1.

Unreacted isocyanate groups can be present in the end-capped polyether oligomer, but are preferably minimized to less than about 0.1 percent by weight to provide an oligomer which contains substantially no free isocyanate groups. It is preferred that there be no detectable isocyanate present.

The end-capped polyether oligomer is then combined with a reactive diluent and a photoinitiator to form a curable coating composition of the present invention. The end-capped polyether oligomer is about 10 weight percent to about 80 weight percent of the coating composition of the present invention and preferably about 15 to about 50 weight percent of the coating composition.

The examples of polymeric coating compositions set forth above are intended to be illustrative of the coating compositions that may be employed in the present invention. It is recognized that any coating composition in which a poly(siloxane) may be incorporated falls within the scope of this invention.

Other components that may be present in the composition include, but are not limited to, light sensitive and light absorbing components, catalysts, initiators, lubricants, wetting agents, organofunctional silanes, antioxidants, and stabilizers.

A good example of a specific inner primary coating composition that may be used in the present invention is described in U.S. Pat. No. 4,682,851 to Ansel, issued Jul. 28, 1987, which is hereby incorporated by reference. In the case of an optical fiber, a suitable inner primary polymeric composition for application to an optical fiber should have an appropriate viscosity for application, should be fast curing, should be compliant enough at low temperatures to limit optical loss, and should be resistant to penetration from most chemicals or solvents that the fibers are likely to encounter in practical use.

A good example of a specific outer primary coating composition that may be used in the present invention is described in U.S. Pat. No. 4,472,019, to Bishop et al., issued Sep. 18, 1984, which is hereby incorporated by reference. In the case of an optical fiber, a suitable outer primary polymeric composition for application to an optical fiber coated with an inner primary coating should have an appropriate viscosity for application, should be fast curing, should be tough enough to protect the fiber from mechanical handling, should adhere to the inner primary coating well enough to allow complete and easy removal of all coatings from the optical fiber, and should be resistant to penetration from most chemicals or solvents that the fibers are likely to encounter in practical use.

A good example of a specific single coat composition that may be used in the present invention is described in U.S. Pat. No. 4,932,750, to Ansel et al., issued Jun. 12, 1990, which is hereby incorporated by reference. In the case of an optical fiber, a suitable single coat composition for application should have an appropriate viscosity for application, should be fast curing, should be compliant enough at low temperatures to limit optical loss, should be tough enough to limit abrasion, and should protect the optical fiber from exposure to most chemicals or solvents.

A good example of a specific glass substrate coating composition that may be used in the present invention is described in U.S. Pat. No. 5,112,658, to Skutnik, et al., issued on May 12, 1992, which is hereby incorporated by reference. In the case of a generic glass coating, a suitable coating composition for application to non-optical fiber glass substrates should have an appropriate viscosity for application, should be tough enough to limit abrasion, and should be fast curing.

In producing a coated substrate, a liquid coating composition is applied to a substrate and subsequently cured. Typically, the cure is affected using ultraviolet or visible radiation. However, other methods are available. For example, thermal curing, usually in the presence of an initiator, may be used. Alternatively, the coating can be cured by electron beam irradiation where no catalyst is required. More than one coating may be applied. Typically, a first coating is applied and cured followed by a second coating and so on until the desired number of coatings have been applied. Alternatively, the layers can be applied on top of each other as liquids, described herein as a wet-on-wet process, with one final curing step at the end.

In many applications involving optical fibers it is desirable to have an outermost layer (outer primary layer) that is tough or hard that can protect the optical fiber and underlying coatings, including the inner primary coating, which may be relatively soft in comparison to the outermost coating. To further enhance strength retention, the inner primary coating may be modified with a poly(siloxane) and any outer primary coatings may be modified with a strong acid functional ethylenically unsaturated monomer such as phosphoric acid monoacrylate, commercially available as Ebecryl 170 through Radcure Specialties in Atlanta, Ga. Other such strong acid functional ethylenically unsaturated monomers are also suitable. Another example is 2-acrylamido-2-methylpropanesulfonic acid, commercially available as Lubrizol™ 2401 through the Lubrizol Corporation in Wickliffe, Ohio. The strong acid functional ethylenically unsaturated monomer is preferably present in the range of about 0.1% to about 10% by weight of the entire outer primary coating composition. In one of the preferred embodiments of the invention, at least the inner coating contains a poly(siloxane) and at least one of the outer primary coatings is comprised of an ethylenically unsaturated monomer which has a strong acid functional group.

In many applications involving optical fibers it is desirable to have more than one coating layer, e.g., at least one inner and one outer primary coating, which is easily removed or stripped as a unit without leaving any coating residue on the so stripped glass fiber. To further enhance this stripablility and enhance strength retention, the inner and outer primary coatings may both be modified with a poly(siloxane). The poly(siloxane) is preferably present in each coating in the range of about 0.1% to about 30% by weight the entire coating compositions in which the poly(siloxane) is found. In one of the preferred embodiments of the invention, at least the inner coating contains a poly(siloxane) and at least one of the outer primary coatings contains a poly(siloxane).

An inner primary coating could, for example, comprise 30–80 wt. % (meth)acrylate oligomer, 0–70 wt. % (meth)acrylate monomer, 0–3 wt. % antioxidant, 0.5–10 wt. % photoinitiator, 0–30 wt. % organofunctional silane and 0.1–30 wt. % poly(siloxane). As an example, but without being limited thereto, such a coating could comprise about 60 wt. % oligomer, obtained by reacting hydroxyethyl acrylate, a diisocyanate such as toluene diisocyanate and a polyoxyalkylene diol, such as polypropylene glycol, about 33 wt. % phenoxyethyl acrylate as a monomer, about 1 wt. % thiodiethylene bis (3,5-di-tert-butyl-4 hydroxy) hydrocinnamate as an antioxidant, about 3 wt. % 1-hydroxycyclohexyl phenyl ketone as a photoinitiator, and about 3 wt. % Dow Corning 1-6184.

As another example of an inner primary coating, but without being limited thereto, such a coating could comprise about 60 wt. % oligomer, obtained by reacting hydroxyethyl acrylate, a diisocyanate such as isophorone diisocyanate and a polyalkylenediol, such as hydrogenated 1,2-polybutadiene diol, about 13 wt. % nonyl phenol acrylate as a monomer, about 10 wt. % lauryl acrylate as a comonomer, about 1 wt. % thiodiethylene bis (3,5-di-tert-butyl-4 hydroxy) hydrocinnamate as an antioxidant, about 3 wt. % 1-hydroxycyclohexyl phenyl ketone as a photoinitiator, and about 3 wt. % Dow Corning 1-6184.

An outer primary coating could, e.g., comprise 30–80 wt. % (meth)acrylate oligomer, 0–70 wt. % (meth)acrylate monomer, 0–3 wt. % antioxidant, 0.5–10% photoinitiator, and 0.1–30 wt. % Dow Corning 1-6184. As an example, but without being limited thereto, such a coating could comprise about 40 wt. % oligomer, obtained by reacting hydroxyethyl acrylate, a diisocyanate such as toluene diisocyanate and a polyalkylene diol, such as polypropylene glycol, about 25 wt. % bisphenol A diglycidyl ether diacrylate as a monomer, about 10 wt. % trimethylolpropane triacrylate as a monomer, about 20 wt. % phenoxyethyl acrylate as a monomer, about 1 wt. % thiodiethylene bis (3,5-di-tert-butyl-4 hydroxy) hydrocinnamate as an antioxidant, about 3 wt. % 1-hydroxycyclohexyl phenyl ketone as a photoinitiator, and about 1 wt. % phosphoric acid acrylate.

As another example of an outer primary coating, but without being limited thereto, could comprise about 40 wt. % oligomer, obtained by reacting hydroxyethyl acrylate, a diisocyanate such as isophorone diisocyanate and a hydrophobic polyester diol, such as polycaprolactone diol, about 25 wt. % bisphenol A diglycidyl ether diacrylate as a monomer, about 10 wt. % trimethylolpropane triacrylate as a monomer, about 18 wt. % phenoxyethyl acrylate as a monomer, about 1 wt. % thiodiethylene bis (3,5-di-tert-butyl-4 hydroxy) hydrocinnamate as an antioxidant, about 3 wt. % 1-hydroxycyclohexyl phenyl ketone as a photoinitiator, and about 3 wt. % Dow Corning 1-6184.

The following example is intended to illustrate a particular embodiment of the invention, and is not intended to limit the claims or any other part of the specification in any way.

EXAMPLE

A curable coating composition may generally be comprised of the following:

| Component | Amount (%) |
|---|---|
| 1. A Urethane Acylate Oligomer | 0–80 |
| 2. A Monomer | 0–80 |
| 3. A Photoinitiator | .1 to 10 |
| 4. A Stabilizer/Antioxidant | .1 to 10 |
| 5. A Poly(alkoxysiloxane) | .1 to 50 |

Below is a specific curable coating composition:

| Component | Amount (%) |
|---|---|
| HEA-(IPDI-Permanol KM-1733)$_{2.27}$-IPDI-HEA | 43.2 |
| Ethoxylated nonyl phenol acrylate | 28.35 |
| Octyl Decyl Acrylate | 10.8 |
| Phenoxyethyl acrylate | 4.5 |
| 1 hydroxycyclohexylphenyl ketone | 2.7 |
| 1 tetrakis[methylene(3,5-ditertbutyl-4-hydroxyhydrocinnamate)]methane {Irganox 1035} | 0.45 |
| Dow Corning 1-6184 | 10 |

I claim:

1. A curable coating composition for a glass substrate, said composition comprising: an oligomer that is the reaction product of a hydroxy functional monomer containing ethylenic unsaturation, a polyisocyanate and a hydroxyfunctional polyether; and a poly(siloxane) having the formula:

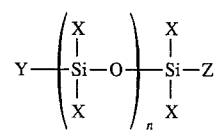

wherein Y and Z are independently selected from the group consisting of halogen, alkyl and alkoxy; n is one or more; and each X is independently a hydrolyzable group or a siloxane group.

2. The composition according to claim 1 wherein each X is an alkoxy group.

3. The composition according to claim 2, wherein the alkoxy groups are lower alkoxy groups.

4. The composition according to claim 2, wherein the alkoxy groups are independently selected from the group consisting of methoxy and ethoxy.

5. A curable coating composition for a glass substrate according to claim 1 wherein some X are siloxane groups and some X are alkoxy groups.

6. The composition according to claim 1, wherein the poly(siloxane) is present in an amount in the range of about 0.1 to about 30 wt. %, relative to the total composition.

* * * * *